United States Patent [19]

Delomel

[11] Patent Number: 5,167,399
[45] Date of Patent: Dec. 1, 1992

[54] METHOD OF MANUFACTURING AN OVERHEAD ELECTRICAL POWER TRANSMISSION LINE, AND EQUIPMENT FOR IMPLEMENTING THE METHOD

[75] Inventor: Jean-Charles Delomel, Lens, France

[73] Assignee: Alcatel N.V., Amsterdam, Netherlands

[21] Appl. No.: 624,087

[22] Filed: Dec. 7, 1990

[30] Foreign Application Priority Data

Dec. 13, 1989 [FR]  France .................................. 89 16498

[51] Int. Cl.⁵ ............................................ B65H 59/00
[52] U.S. Cl. ............................................. 254/134.3 R
[58] Field of Search ............... 254/134.3 R, 134.3 PA, 254/134.3 FT

[56] References Cited

U.S. PATENT DOCUMENTS 2,432,121  12/1947  Nickell .
3,073,574   1/1963  Garnett ......................... 254/134.3 R
4,602,763   7/1986  Gaylin ......................... 254/134.3 FT

FOREIGN PATENT DOCUMENTS 1552497   1/1969  France .
2306511  10/1976  France .
1224887   4/1986  U.S.S.R. ......................... 254/134.3 R
1222242   5/1987  U.S.S.R. ......................... 254/134.3 R
 608889   9/1948  United Kingdom .

Primary Examiner—Robert C. Watson
Attorney, Agent, or Firm—Brunell & May

[57] ABSTRACT

The method is implemented on the site where the cable is to be installed on pylons, and consists in taking wire strands from individual reels to make up a bundle, and in clamping the bundle together to obtain the cable as and when the cable is required for installation purposes. The invention is applicable to transporting electrical power.

6 Claims, 3 Drawing Sheets

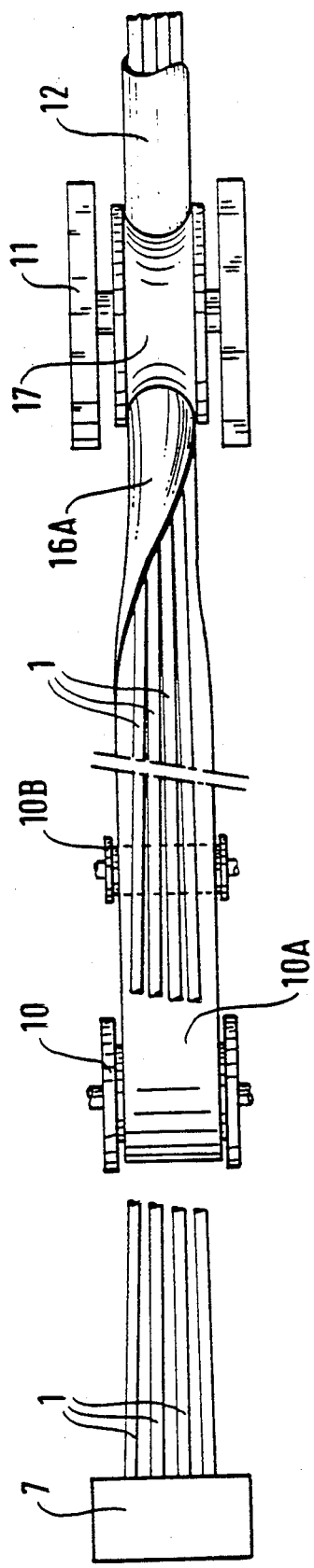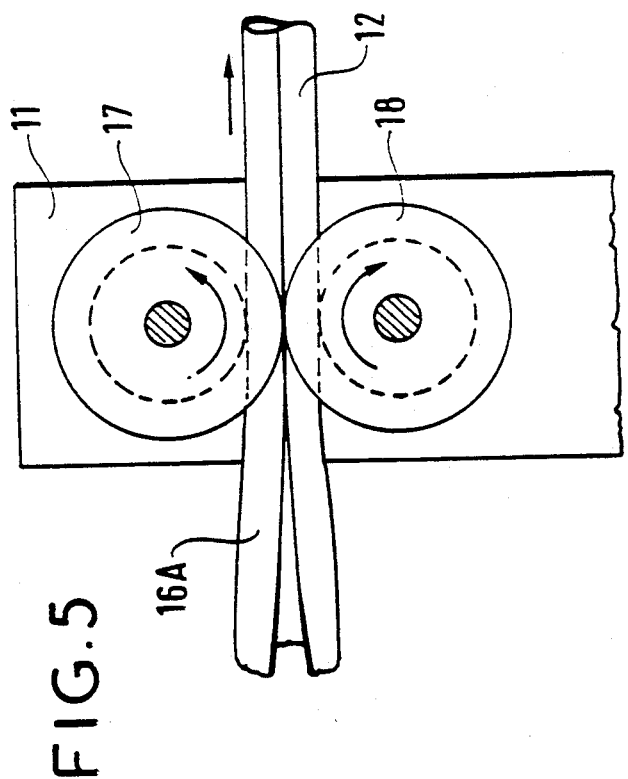

METHOD OF MANUFACTURING AN OVERHEAD ELECTRICAL POWER TRANSMISSION LINE, AND EQUIPMENT FOR IMPLEMENTING THE METHOD

The present invention relates to an overhead electrical power transmission line comprising a multiplicity of elementary conductors. It relates to a method of manufacturing such a cable and to equipment for implementing the method.

BACKGROUND OF THE INVENTION

Conventional overhead electrical power transmission line cables comprise a central wire core having wire strands twisted thereabout. These wires or strands may be made of copper, aluminum, or aluminum alloy. It is also possible to have composite cables having a steel wire core with the surrounding strands being made of aluminum or of aluminum alloy.

They suffer from drawbacks. Firstly, the length required for the strands that are twisted around the central core is greater than the length of the resulting cable. If the angle formed between the strands and the axis of the cable is written $\alpha$ and if the length of the cable as a whole is written l, then the total length of any one strand is $l/(\cos \alpha)$ so the additional length, corresponding to an increase in cost per unit length of cable, is $l[(1/\cos \alpha) - 1]$. Further, the alternating current carried by the cable generates magnetic flux and thus gives rise to magnetic losses in a central wire core made of steel.

Further, the outer surface of the conductor is not smooth and this gives rise to considerable turbulence in the flow of air around the cable, and thus to cable vibration.

An object of the present invention is to provide a cable for an overhead electrical power transmission line of reduced cost, having lower magnetic losses, which is less subject to vibration, and which is manufactured and laid simultaneously.

SUMMARY OF THE INVENTION

The present invention provides a method of manufacturing such a cable, in which the method is implemented directly on the site where said cable is mounted on pylons of the transmission line, the method consisting in taking said strands from individual reels, in making a bundle in which said strands are parallel and close together, in clamping said bundle in said clamping means in order to obtain said cable, and in drawing said cable so as to install it on the pylons, with the cable being made simultaneously with the cable being installed.

The invention also provides equipment for implementing the method, the equipment including a strand feed station carrying said individual reels, a plate pierced by a plurality of orifices for guiding strands taken from said reels, thereby delivering said bundle, a clamping station provided with clamping means through which said bundle travels, guide means for guiding the cable on the arm of a pylon, said guide means receiving said cable from the clamping station; and cablepulling means to which the end of the cable is fixed.

In this equipment, the clamping means are constituted either by a cylindrical sleeve obtained from an initially plane strip which is deformed into a trough-shape and is then closed onto itself, or by a tape which is wound helically around the bundle, or else by clamping collars.

In particular, the presence of a cylindrical sleeve around the strands gives the cable a much smoother outside surface, thereby reducing turbulence in the air in contact with the outside surface of the cable and thus reducing cable vibration and reducing corona effects as little as possible.

If telecommunications members are to be added to the power transmission cable, the center or core of the cable should include a tube containing one or more optical fibers or electrical conductors for telecommunications purposes.

BRIEF DESCRIPTION OF THE DRAWINGS

Embodiments of the invention are described by way of example with reference to the accompanying drawings, in which:

FIG. 4 is a view on a larger scale of members for inserting a strip and forming it into a trough-shape around the strands, and then for closing the trough-shape;

FIG. 5 is a plan view on a larger scale showing the wheels for closing the trough;

DETAILED DESCRIPTION

Figure 1:
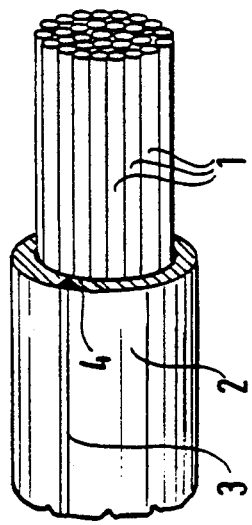
FIG. 1 is a perspective view of a fragment of cable in which the strands are enclosed in a cylindrical sleeve.

In FIG. 1, elementary wire strands 1 are enclosed in a cylindrical sleeve 2 whose edges meet along a line of contact 3 which may optionally be welded together by a longitudinal weld fillet 4.

Figure 2:
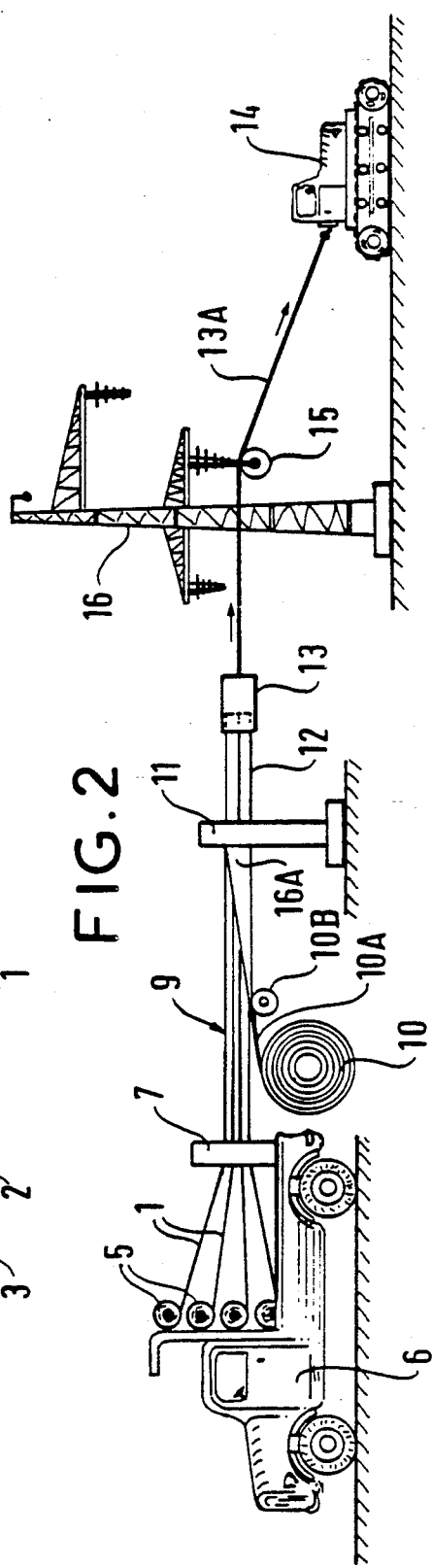
FIG. 2 is a diagram of a device for manufacturing and installing such a cable.

FIG. 2 shows simultaneous manufacture and installation of a parallel-strand cable, thereby avoiding the need to perform the following operations separately and in succession: cable manufacture; cable storage; cable transport to the installation site; and finally cable installation.

Figure 3:
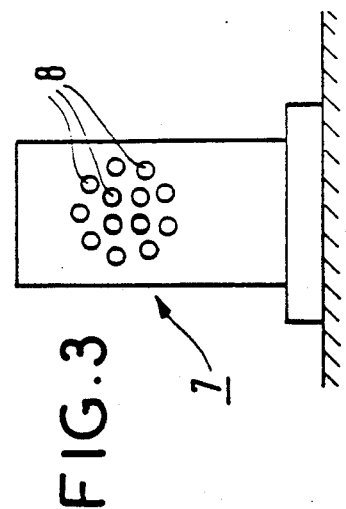
FIG. 3 is an elevation view on a larger scale of a guide plate for the strands.

The strands 1 are paid out from reels 5 disposed on a truck 6 carrying a plate 7 at its rear end which is perforated with closely spaced holes, the plate being shown in elevation in FIG. 3 where the holes 8 are visible.

On leaving the plate 7, the strands are parallel and close together. They form a bundle 9. A strip of metal or plastic material 10A is also paid out from a roll 10, e.g. an aluminum strip, which strip is guided over a wheel 10B and is inserted together with the strands into a shaping member shown highly diagrammatically at 11, and inside which member the strip is formed progressively into a trough-shape and then the trough is closed up so as to provide a completed cable 12. This cable is drawn by a steel traction cable 13A connected by means of a connector 13 and hauled by a tractor 14, passing over a pulley 15 for installing it on an arm of a pylon 16.

FIGS. 4 and 5 are diagrams showing the member for forming the cable sleeve in greater detail.

On leaving the roll 10, the plastic or metal strip 10A passes over a pulley 10B and then through a series of forming cradles of ever-decreasing radius of curvature (not shown). On leaving the cradles, the through 16A is calibrated by passing between two wheels 17 and 18 which impart the final diameter to the finished cable 12.

Figure 6:
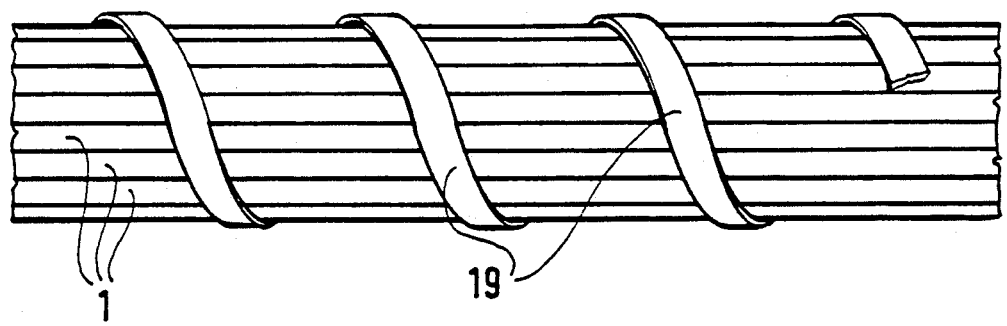
FIG. 6 is a side view of a fragment of cable having its strands enclosed by a helically wound tape.

FIG. 6 shows a variant in which the strands are clamped together by means of a helically wound tape 19. This tape is wound off a reel which is rotated about the bundle of strands using a technique that is well known in cable making. The tape is shown as being relatively narrow and as being wound with large gaps around the strands, thereby facilitating comprehension. However, in practice, the tape may be much wider and wound with much smaller gaps, possibly with touching edges or even with overlapping edges.

Figure 7:
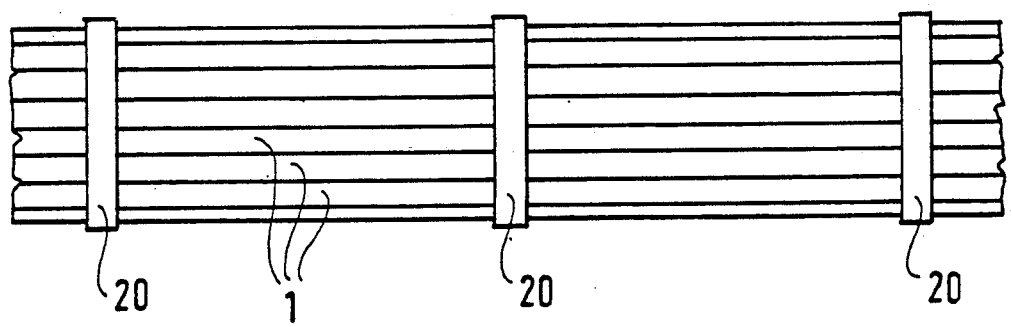
FIG. 7 is a side view of a fragment of cable in which the strands are clamped together at regular intervals by clamping collars.

In FIG. 7, the strands 1 are clamped together by means of collars 20 which are disposed at regular intervals along the cable. These collars are delivered, installed, and clamped by means of a clamping station (not shown) which puts them into place and clamps them at regular intervals around the strands as they advance.

Figure 8:
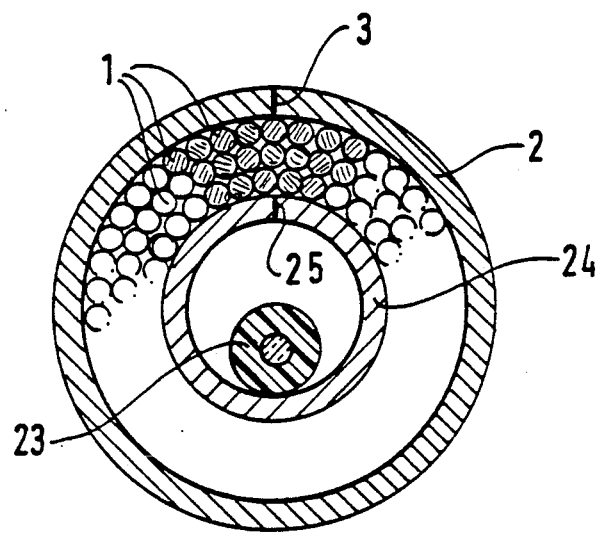
FIG. 8 is a cross-section through a cable having a tube in its center containing a telecommunications optical fiber.

FIG. 8 shows a cable having a central space which is surround by the power-conveying strands 1 and which contain a telecommunications optical fiber 23 which is disposed loosely inside a surrounding tube 24 whose edges are welded together by a longitudinal weld 25.

Such a cable is readily manufactured by initially disposing the optical fiber (or an electrical telecommunications cable) inside a tube which is intended to become the inside component of the power transmission cable, and then by disposing the power-conveying strands around the inner tube by passing them through appropriate holes in an annular zone of a plate, and finally forming the outer tube or sleeve thereabout, as described above.

I claim:

1. A method of on site manufacture and installation of a multistrand cable length for an overhead electrical power transmission line of the type having multiple elementary wire strands held together by clamping means and supported by pylons, the method comprising the steps of:

providing at said site a plurality of individual reels, each holding a different one of said strands, taking each of said elementary wire strands from a different respective one of said individual reels, making a loose bundle comprising all of said elementary wire stands in which said strands are parallel and close together, leading said loose bundle from said individual reels to a clamping station, permanently clamping said bundle inside said clamping means at said clamping station to form a continuous section of multistrand cable extending from the clamping station, and drawing said cable section from said clamping station so as to form said cable length, and installing said cable length on the pylons as it is being drawn from the clamping station, whereby the cable length is made simultaneously with the cable being installed.

2. A manufacturing method according to claim 1, further comprising the step of:

placing an optical fiber in a tube in a prior operation, wherein said making step makes up said bundle around said tube.

3. A manufacturing method according to claim 1, further comprising the steps of:

forming said loose bundle by drawing individual said strands through corresponding perforations, guiding the cable on the arm of a pylon, and pulling the end of the cable.

4. A manufacturing method according to claim 3, further comprising the steps of:

delivering a plane continuous clamping strip, deforming said strip into a trough-shape, and closing said trough over said bundle.

5. A manufacturing method according to claim 3, further comprising the step of:

rotating a tape about the axis of travel of said bundle so as to wind the tape helically around said bundle.

6. A manufacturing method according to claim 3, further comprising the step of:

mounting a plurality of clamping collars on said bundle.

* * * * *